United States Patent Office 3,511,648
Patented May 12, 1970

3,511,648
ELECTROPHOTOGRAPHIC COATINGS
Walter L. Garrett, Freeland, Mich., assignor to The Dow Chemical Company, Midland, Mich., a corporation of Delaware
No Drawing. Continuation-in-part of application Ser. No. 576,844, Sept. 2, 1966. This application May 27, 1969, Ser. No. 828,348
Int. Cl. G03c 5/00
U.S. Cl. 96—1.7
8 Claims

ABSTRACT OF THE DISCLOSURE

The electrophotographic method of preparing etchable printing plates employing a photoconductive composition comprising a photoconductive zinc oxide suspended in a cross-linking resinous insulating film forming binder, wherein said composition as a coating on a plate of etchable base metal of magnesium is electrostatically charged, exposed to an illuminated image, thereby forming an electrostatic image thereon, which is then developed by contacting and subsequently heating said image with a catalyst material to promote cross-linking of said resinous binder, thereby to form an etch resist image pattern; is improved by employing as the resinous binder component of the photoconductive composition from about 15 to about 90 percent of a solid soluble epoxy resin of diglycidyl ether of bisphenol-A, and from about 0.25 to about 10 percent of polyvinylbutyral resin, balance remaining being a silicone intermediate resin, the total resin component of the photoconductive composition lying in the range of from about 90 to about 40 weight percent, the balance of the composition comprising said photoconductive zinc oxide.

The improved photoconductive composition for use in electrophotographic composition comprises from about 40 to about 90 weight percent of a photoconductive zinc oxide, and from about 60 to about 10 percent by weight of a resinous binder comprising from about 15 to about 90 percent of a solid soluble epoxy resin of diglycidyl ether of bisphenol-A, and from about 0.25 percent to about 10 percent polyvinylbutyral resin, the balance of resin content being up to 84.75 percent silicone intermediate resin.

CROSS REFERENCE TO OTHER APPLICATION

This application is a continuation-in-part of co-pending application Ser. No. 576,844, filed Sept. 2, 1966, and now abandoned.

BACKGROUND OF THE INVENTION

Field of the invention

This invention relates to electrophotography and more particularly relates to a novel and improved photoconductive coating composition for use in electrophotography for making printing plates and lithographic masters.

Description of the prior art

One disclosed method of electrophotographically preparing printing plates comprises, for example, first establishing a thin photoconductive coating on an etchable plate of photoengraving grade magnesium or zinc base metal. The photoconductive composition may comprise, for instance, a mixture of a photoconductive zinc oxide suspended as a fine dispersion of particles in a cross-linking, film forming, resinous insulating binder. Suitable resinous binders include, for example, silicone intermediate resins and solid soluble epoxy resins of diglycidyl ether of 4,4′-isopropylidenediphenol(bisphenol-A). The plate so-coated is then negatively electrostatically charged by corona discharge means and exposed to an illuminated image desired to be reproduced, either by contact or focus techniques, thereby to form a latent electrostatic image or pattern on the plate. The images to be reproduced commonly include design work, lines, letters, and photographs. In the case of photographs, the image must first be "screened" in order to break up the image into so-called halftone dots before the charged plate is exposed thereto.

The latent image is subjected to the action of a number of subsequent steps to "develop" it to convert it to a visible fixed image called a "resist," which is, e.g., resistant to an acid etching composition, or, to convert it to an image suitable, e.g., for use in lithographic printing masters. These subsequent steps may comprise, for example, contacting the electrostatic image with cross-linking promoting catalyst particles of dimethoxy aluminum octanoate, said particles being triboelectrically positively charged, and suspended in an inert hydrocarbon carrier liquid of, e.g., an isoparaffinic hydrocarbon liquid, or, Freon TF halogenated hydrocarbon. So-contacted, the plate is rinsed as free of catalyst particles as possible, dried, then exposed to an elevated temperature to promote cross-linking (or curing) of the resin binder to form the aforesaid "photo resist" in the image areas. The non-image areas, not having had catalyst deposited thereon, are then removed with a suitable solvent and scrubbing. Any chromate conversion coatings underlying the "resist" are removed, e.g., by an acid wash. The plate now exhibiting a visible image is ready for etching in the case where a photoengraving is desired, preferably by one of the powderless etching processes disclosed and claimed in U.S. Letters Patent 2,828,194 or 3,152,083. The plate may also be powder-etched.

Though acceptable etchable photoengraving plates may be produced by means of the electrophotographic process described hereinbefore, the process suffers from a number of problems or disadvantages which renders it somewhat commercially unacceptable. Among these problems or disadvantages is that the silicone-containing coatings are penetrable to some extent by the acid etching bath used in the powerless etching process, such as nitric acid used for etching magnesium, causing softening of said coating. In addition, these coatings are somewhat leached out by said bath. Moreover, these silicone-containing coatings, though providing good flowability for application on the plate, are poorly adherent to bare metal, and thus require a surface treatment, such as application of a chromate conversion layer between the coating and plate, for proper adhesion. Accordingly, a surface conversion layer must initially be applied both as an acid etch resist and as a non-metal conversion coating to protect the metal plate and render the surface thereof receptive to an adherent coating. This requires lengthy extra steps in the process, and additional materials and equipment, not to mention the subsequent step of removing said layer so as to expose the bare metal for etching.

Another disadvantage of the silicone containing coatings is that extreme care must be exercised, even after curing the coating, to avoid abrasion damage to the plate during processing lest it be ruined, thus requiring making another plate at additional cost and time.

The use of epoxy resins as binders substantially improves the adherence of the coatings to the metal plate, compared to silicone resins, but they are not entirely commercially sufficient in providing coated electrophotographic plates which are reliably adherent and abrasion resistant, and which will hold halftone dots before and during etching.

There exists, therefore, a great need for a superior, commercially acceptable, photoconductive composition as a coating material for electrophotographic plates which when cured is solvent and acid resistant, highly adherent to a metal substrate and very resistant to abrasion, and which will retain intact halftone dots, both before and after etching of the plate, as well as eliminate the need for chromate conversion coatings on the bare metal surface of the plate prior to applying the photoconductive composition as aforesaid.

OBJECTS OF THE INVENTION

An object of the present invention, therefore, is to provide an improved photoconductive composition for use in electrophotographic printing which substantially avoids the disadvantages and difficulties described hereinbefore, and provides a superior electrophotographic plate.

A further object of the present invention is to provide an improved cross-linking photoconductive composition for application as a coating on metal plates, which coating is reliably adherent to bare metal, is solvent and etch resistant, is hard, thus subject to less damage due to mechanical abrasion during handling, shipping, and processing, has a fast light decay characteristic and a slow dark decay characteristic, and which takes on and retains a high electrostatic charge.

Other objects and advantages will become apparent as the description of the invention proceeds.

DEFINITIONS

The term "dark decay" as used herein refers to the characteristic or property of an electrostatically charged photoconductive layer or coating of losing said charge in the dark or in a subdued appropriately colored light, as a function of time, without incurring detrimental loss of said charge below an effective level needed for electrophotographic reproduction purposes.

The term "light decay" refers to the characteristic or property of the recording element to rapidly dissipate an electrostatic charge to a sufficiently low level upon being exposed to a given intensity of electromagnetic radiation so as to permit formation of a sharp latent electrostatic image for further developing.

SUMMARY OF THE INVENTION

In general, the novel photoconductive composition of the present invention comprises, by weight, (a) from about 40 to about 90 percent, and preferably from about 60 to about 70 percent, of a photoconductive zinc oxide, (b) from about 60 to about 10 percent by weight of a resinous binder material, said binder material containing from about 15 to about 90 percent of a soluble solid epoxy resin of diglycidyl ether of bisphenol-A, and from about 0.25 percent to about 10 percent of polyvinylbutyral resin, preferably 0.5 to 3.0 percent, the balance of binder material being a silicone intermediate resin. If desired, an effective amount based on the weight of the total composition, of one or more sensitizing dyes, such as, e.g., a fluorescein disodium salt (Color Index No. 45350), Rose Bengal (Color Index No. 45440), or Bromphenol Blue, may be employed to render the zinc oxide more responsive or particularly responsive to light of a preselected wave length region.

The improvement in method described and claimed herein comprises, in an electrophotographic method of preparing etchable printing plates, using a photoconductive composition to lay down the acid resist layer using as the resinous binder component of the photoconductive composition the foregoing described combinations of specified epoxy resin and specified polyvinylbutyral resin with or without silicone intermediate resin.

DESCRIPTION OF THE INVENTION

Suitable coatings are obtained herein both with epoxy and polyvinylbutyral resin mixtures alone as well as with blends of said mixtures with one or more silicone intermediate resins, or, as a prepolymer of the epoxy, polyvinylbutyral, and one or more of said silicon intermediate resins. Such combinations provide flow-ability to the composition with respect to application of the composition on plates. The silicone content in the blend or in the prepolymer will preferably be a binder amount within the range of from about 15 to about 50 percent by weight of the total weight of binder material used in the composition and may be as high as about 85 percent. Upon being catalyzed and cured, the resins will cross-link and/or condense together, as described hereinbefore, in a manner similar to that of the individual resins.

Suitable epoxy resins within the class described have epoxide equivalent weights, i.e., average molecular weights per epoxide unit, in the range of from about 250 to 5500, preferably in the range of about 475 to 2000, and most preferably about 475 to about 575.

Suitable examples of epoxy resins include the following:

DER 661 resin: An epoxy resin of diglycidyl ether of bisphenol-A, having an epoxide equivalent weight of from 475 to 575.

DER 664 resin: An epoxy resin of diglycidyl ether of bisphenol-A, having an epoxide equivalent weight of from 875 to 975.

DER 667 resin: An epoxy resin of diglycidyl ether of bisphenol-A, having an epoxide equivalent weight of from 1600 to 2000.

Suitable polyvinylbutyral resins for use in the present composition and method are generally prepared by the condensation of butyraldehyde and polyvinyl alcohol, have unreacted hydroxyl sites, are generally soluble in polyhydroxy organic solvents such as glycols, including alkyl and ether glycols, and are further soluble in such monohydroxy alcohols as ethyl alcohol and n-decyl alcohol, and exhibit an intrinsic viscosity in the range of about 0.5 to about 1.5. The presence of unreacted hydroxyl sites is essential since the resinous binder mixture must be capable of undergoing cross-linking during development of the resist coating on the metal plate being coated. The extent of unreacted hydroxyl sites should correspond to an unreacted polyvinyl alcohol content, albeit within the chain, of about 10 to 30 percent polyvinyl alcohol, and more preferably, about 15 to 25 percent.

Suitable silicone intermediate resins are likewise essentially possessed of active hydroxyl groups through which cross-linking takes place during development or curing of the coating according to the invention. Such resins may be straight chain, e.g., SR-82 resin, or cyclic, e.g., Z-6018, in structure, but consist of siloxane chain or skeletal structure having attached thereto lower alkyl or phenyl groups, in addition to the OH groups. The OH groups are generally produced by hydrolyzing off halogens, e.g., chlorine atoms, and since hydrolysis is usually more or less complete, these resins are substantially non-halogenated. Two specific examples of silicone intermediate resins are described as follows:

SR-82 silicone intermediate resin, as indicated in the General Electric Co. products bulletin "Silicones Product Data," Revision A, superseding the issue of Aug. 15, 1955, is characterized (1) as a hard silicone resin suggested primarily as a blending resin compatible with many organic resins, and (2) as a silicone polymer with OH groups thereon for polymerizing further. The resin is supplied as a straw colored xylol solution with about 60% solids content, a specific gravity of about 1.06 at 25° C., a viscosity in the range of 5 to 30 centipoises at 25° C., and with no catalyst present.

Z-6018 silicone intermediate resin, according to the Dow Corning bulletin 03-013, dated September 1964, and entitled "Information About Silicone Protective Coating Resins," is a hydroxy-functional (5.5% condensible hydroxyl) content), low molecular weight (avg. 1600), silicone intermediate which will react with a wide variety of organic protective coating resins and monomers. The intermediate has a refractive index of 1.531 to 1.539. A xylene solution containing 60% by weight of this intermediate is clear, has a specific gravity of 1.075 at 77° F., and exhibits a viscosity of 33 centipoises at 77° F.

If the mixture of resins employed in the resinous binder are accidentally or incidentally polymerized together to form a prepolymer, as by heating, producing a more viscous resin blend, the same fine results are still obtained according to the invention.

The zinc oxide which may be used in the present novel photoconductive composition is a photoconductive zinc oxide which is substantially electrically nonconductive in the dark and which exhibits a surface photoconductivity of at least a minimum level sufficient for practical use in the composition. An example of such a photoconductive zinc oxide is Florence Green Seal No. 8 zinc oxide made by New Jersey Zinc, Inc. The minimum level of photoconductivity of the zinc oxide is normally about $10^{-9}$ ohm$^{-1}$ cm.$^2$ (when subjected to light of a wavelength of at least about 3900 A.).

Cross-linking promoting catalysts which may be used to cross-link or promote cross-linking of the resins described herein, or prepolymers and blends thereof, as binders used in the present invention include, for example, alkoxy aluminum fatty acid salts, for example, dimethoxy aluminum octanoate, diethoxy aluminum octanoate; alkoxy ether aluminum fatty acid salts, for example, aluminum ethoxy ethyl ether octanoate, aluminum ethoxy methyl ether octanoate, and other organic metallic salts of carboxylic acids. Dimethoxy aluminum octanoate has been found to be a particularly good catalyst.

Generally, these alkoxy aluminum fatty acid catalyst salts are those wherein the alkoxy group of said salt contains from 1 to 10, inclusive, carbon atoms, and the fatty acid radical thereof contains from 6 to 18 atoms, inclusive. They may be prepared by reacting a primary alcohol within aluminum fatty acid salt under alkaline condition, said alcohol having from 1 to 10 carbon atoms, inclusive, and the fatty acid radical of said salt having from 6 to 18 carbon atoms, inclusive, at a temperature of from about 20° to about 250° C., thereby forming the alkoxy salt, whereupon, said alkoxy salt is separated from the reaction mass and thereafter normally washed. The alkoxy aluminum fatty acid salts may also be prepared by reacting an alcohol-soluble aluminum inorganic salt with a primary alcohol having said requisite number of carbon atoms, to form an ethoxy aluminum salt, then admixing an aliphatic fatty acid therewith, said acid also having the requisite number of carbon atoms, neutralizing the solution so-formed, thereby forming the alkoxy aluminum fatty acid salt as a precipitate, whereupon, said precipitate is separated from the liquid phase and thereafter normally washed.

The alkoxy ether aluminum fatty acid catalyst salts generally conform to the structure

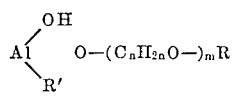

wherein R' represents a fatty acid radical containing from 6 to 12, inclusive, carbon atoms, $n$ represents an integer of from 2 to 3, inclusive, $m$ represents an integer of from 1 to 3, inclusive, and R represents an alkyl radical containing from 1 to 4 carbon atoms, inclusive. They may be prepared by reacting a primary straight chained glycol ether with an aluminum fatty acid salt under alkaline condition, the fatty acid radical of said salt having from 6 to 12 carbon atoms, inclusive, thereby forming the corresponding alkoxy ether aluminum fatty acid salt, whereupon, said alkoxy ether salt is separated from the reaction mass and normally washed.

These novel epoxy and epoxy-silicon-blend photoconductive compositions with polyvinylbutyral have excellent photoelectrical properties, are highly solvent resistant, when cured, and are substantially not penetrated nor softened and are not leached out by the acid etching baths during powderless etching. Moreover, these compositions are highly adherent to the bare base metal plate. Thus they eliminate the need for the heretofore required surface conversion acid etch resist layer between the metal plate and coating. In addition, unlike similar compositions containing only silicone binders, they form coatings that are hard and act very effectively to resist abrasion during handling after being cured. Moreover the present compositions are also effective in holding intact halftone dots, both before and during etching.

In preparing the present epoxy resin-containing photoconductive compositions wherein the epoxy and polyvinylbutyral are the only resins used, as a binder, ordinarily the photoconductive zinc oxide is milled, for example, in a ball mill in the presence of a fluidizing amount of one or more fluidizing agents, for instance, ethylene glycol ethyl ether, for a period of from 3 to 72 hours to reduce the agglomerate or particle of said zinc oxide to a submicron size as a minimum and up to 100 microns, provided the particles are uniform in size. Preferably, the milling time will be from about 4 to about 18 hours, with an optimum milling time being about 6 hours. Such milling may be done either in the presence or absence of the sensitizing dye, and it is preferable, but not essential, to add the resins binders not more than about 5 to 10 minutes prior to termination of milling. The viscosity of the mix during milling should be within the range of from about 2500 to about 11,000 centipoises, preferably about 5000 to about 6000 centipoises. Therefore, the amount of fluidizer needed to obtain the requisite described viscosity will be used accordingly. For small batches, a Waring blender may be used for milling the zinc oxide. When the blender is used, much shorter milling times are required, for example, times from 5 to 15 and up to 30 minutes are usually sufficient to break up the zinc oxide agglomerates. Normally, during milling, the sensitizing dye, such as, for example, a disodium fluorescein salt, which is conventionally known and used for this purpose, is added. Other such dyes may also be used in amounts as may readily be predetermined by those skilled in the art, depending upon the dye used and spectral response desired. Upon being preferably so-milled, the composition can be applied immediately or be held in semi-quiescence for from about 4 to 16 hours while being gently agitated or stirred to maintain uniformity and to obtain a stabilized viscosity for spraying, for example, from about 20 to about 200 centipoises. Thereafter, the composition is preferably filtered through a 325 to 500 mesh screen and then applied to the previously prepared base plate by, for example, spraying or flow coating to a film thickness of from about 0.3 to about 5 or 6 mils, preferably from about 0.5 to about 1.0 mil.

When milling zinc oxide to which an epoxy-silicone blend as binder is to be added, however, this blend must be added in a binder amount as specified hereinbefore not more than about 5 to 10 minutes prior to termination of milling. If added earlier, detrimental encapsulation of the zinc oxide particles may occur, thereby adversely affecting its photoconductivity.

The term "milling" as used herein refers to a milling action, as in a ball or rod mill, grinding, abrading, or other active means of working the zinc oxide particles and agglomerates to obtain the proper size, whereas, the term "mixing," as used herein, refers to the less vigorous action of merely agitating or otherwise mechanically moving or stirring one or more materials of the composition to obtain a uniform mixture and/or consistency.

Organic liquid fluidizing agents for milling the zinc oxide which may be used other than the one hereinbefore mentioned, ethylene glycol ethyl ether, include, for example, a fluidizing amount of one or more fluidizing materials selected from the group consisting of an organic liquid glycol, for example, ethylene glycol, dipropylene glycol; and anhydrous alcohol, for example, ethyl alcohol, n-decyl alcohol; and ether glycol, for example, propylene glycol methyl ether; and an ether alcohol, for example, 4-methoxy 4-methyl pentanol-2 (Pent-o-Xol), 2-ethoxy ethanol-1.

In addition to the organic liquid fluidizers prescribed for use hereinbefore, fluidizing quantities within the range of from about 0.01 percent by weight to about 3.0 percent by weight, preferably 0.01 to 0.2 percent, may also be used of a fluidizing resin selected from the group consisting of (a) an intermediate silicone resin, and, (b) an epoxy resin containing one or more reactive hydroxyls, for example, an epoxy diglycidyl ether bisphenol-A, or an epoxidized polyolefin. These and other resins, such as, for example, alkyd resins (polyester type) and polyglycols, in such fluidizing quantities (a few drops), together with an inert diluent, such as, for example, methyl ethyl ketone, or preferably Cellosolve acetate, to reduce the mix viscosity, act very effectively as fluidizers and, as aforesaid, cause no detrimental amount of encapsulation of the zinc oxide.

The term "binder quantities of resin," or an equivalent or similar term as used herein, refers to quantities of resin added for the purpose only as a binder for the zinc oxide particles and for the photoconductive composition in general (as opposed to a fluidizing purpose). Binder quantities would normally be in excess of 3.0 percent by weight.

When employing the resins specified above in fluidizing amounts for dispersing the zinc oxide particles, it is normally necessary to incorporate into the mixture an inert diluent to obtain a proper mix viscosity for milling. A proper viscosity has been found to be, for example, one within the range of from about 2500 to 11,000 centipoises, preferably about 5000 centipoises. Suitable diluents for use in the present invention include, for example, xylene, toluene, Pent-o-Xol (trade name of Shell Chemical), and ethylene glycol ethyl ether, depending on the fluidizer being used.

Use of a diluent for proper viscosity during mixing may also be desirable when using one of the non-resin fluidizers, that is, when using one of the aforesaid organic liquid fluidizers specified above, which may have an inherent high viscosity (that is, too high for proper milling). In this case, a less viscous organic liquid fluidizer may be admixed therewith, or, a non-fluidizing inert diluent such as, for example, methly ethyl ketone or toluene may be added. The less viscous organic liquid fluidizers, of course, such as, for example, Pent-o-Xol solvent, inherently serve as their own diluent.

Once formulated, applied to the base plate, electrostatically charged, exposed to an illuminated image and contacted with a cross-linking promoting catalyst as aforesaid, the epoxy binder, or epoxy-silicone resin blends or prepolymers, with polyvinylbutyral are cured (cross-linked) by heating to a temperature of from 400° to about 600° F. for a period of time, of from about 20 to about 3 minutes that varies inversely with the temperature, a suitable period being, for example, 5 minutes at 500° F., other optimum temperature and time combinations being readily determined by those skilled in the art.

The following examples further illustrate the present novel photoconductive compositions and method of preparation. They are not to be construed, however, as limiting the invention thereto.

Example I

A photoconductive composition in accordance with the present invention was prepared by first milling the following ingredients in a Waring blender for 10 minutes:

65 gm. zinc oxide Florence Green Seal No. 8 (New Jersey Zinc Co.)
1.2 cc. of a sensitizer solution of 1.04 grams fluorescein disodium salt in 50 cc. of methanol.
45 cc. Pent-o-Xol (4 methoxy 4 methyl pentanol-2)
30 cc. Dowanol EE (ethylene glycol ethyl ether)

The mixture so-milled was cooled to room temperature (approximately 75–80° F.), whereupon, the following preblended materials were added by shaking agitation:

13.5 gm. SR–82 Silicone resin (60% solids in xylene)
39.8 gm. DER 661 epoxy resin (60% solids in Dowanol EE)
2.5 gm. polyvinylbutyral resin (20% solids in Dowanol EE)

Several photoengraving grade magnesium plates 0.064" x 3" x 4" for imaging, and several small coupons 0.064" x 0.75" x 0.75" of the same metal for electrometer tests, were pumiced and pickled for 20 seconds in a 20% acetic acid-5% sodium nitrate solution. The plates and coupons were then flow-coated with the previously prepared photoconductive composition. After air drying for about 30 minutes, the plates and coupons were dried in an oven at 60° C. for 2 hours, then "light rested" for 24 hours by storage in the absence of light.

The plates were "imaged" as follows, a negative electrostatic charge was applied to the coating by a corona discharge to a level of 430 peak volts on the plate. A latent electrostatic image was established on the charged coating with contact printing techniques by exposing the plate, through a transparency of lines, design and halftones, to 13.5 foot-candles of light for 2 seconds.

So-exposed, the electrostatic image was developed by contact with particles of dimethoxy aluminum octanoate catalyst suspended in a hydrocarbon carrying liquid, e.g., an isoparaffinic hydrocarbon called Isopar G (trade name of Humble Oil & Refining Co.). By such contact, the catalyst particles deposited substantially only on electrostatically charged image areas, but not on the non-image areas of the plate (the latter having been discharged by exposure to the light traversing the transparency). The developed image was cured for 6 minutes at 250° C. to cross-link the resins in the coating and render them substantially solvent and acid resistant. Non-image areas, which did not cure or harden, due to the absence of catalyst, were removed by scrubbing with a solvent blend of 75% Dowanol PM glycol ether and 25% SC–150 aromatic solvent.

The plates were etched by the method substantially as disclosed in U.S. Letters Pat. 3,152,083, and examined. Halftone dots measuring 0.0065 inch in diameter before etching were intact and measured 0.005 inch in diameter after etching. The plates were, in general, of top quality with very acceptable adhesion characteristics.

The coupons were tested by means of an electrometer device for their dark decay and light decay characteristics, which were found to be very acceptable. Data on these tests are presented in the table following in connection with Examples II through V.

Examples II–V

The procedure of Example I was substantially repeated, except that different proportions of silicone, epoxy, and polyvinylbutyral resins were employed in preparation of the photoconductive coatings.

The imaged and developed plates made employing these coatings were etched as in the case of Example I and were found to be of substantially the same high quality both in retention of halftone dots and adhesion to the bare metal plate. Electrometer data of corresponding coupons for these examples, as well as Example I, are presented in the following table.

TABLE

| Example | Peak Voltage | Dark Decay Voltage 60" | Photo Light Decay Voltages 10" | Photo Light Decay Voltages 20" | Composition DER 661 | Composition SR-82 | Polyvinyl-butyral |
| --- | --- | --- | --- | --- | --- | --- | --- |
| I | 430 | 400 | 90 | <10 | 73.5 | 25 | 1.5 |
| II | 350 | 320 | 50 | <10 | 74 | 25 | 1 |
| III | 455 | 435 | 80 | <10 | 72.0 | 25 | 3.0 |
| IV | 345 | 330 | 90 | <10 | 49.4 | 49.4 | 1.2 |
| V | 375 | 355 | 95 | <10 | 24.7 | 74.1 | 1.2 |

Example VI

A photoconductive composition in accordance with the present invention was prepared by first milling the following in No. 1BF Burundum fortified mill jar for 5½ hours at 60 r.p.m. using 6000 grams of ½" x ½" cylindrical Burundum media:

864 grams of Green Seal No. 8 zinc oxide
600 ml. of Pent-o-Xol solvent
600 ml. of Dowanol EE solvent After said 5½ hours of milling, 12 ml. of 4.16% solution of fluorescein disodium salt dye in methanol was added, whereupon, the mixture was milled for an additional 30 minutes. The following (blended) resin mixture was added to the foregoing composition and milled for another 5 minutes:

180 grams of SR-82 silicone resin
528 grams of Dow Chemical DER 661 epoxy resin (60% solids in Dowanol EE solvent)
44.3 grams of polyvinylbutyral resin (as defined) (15% solids in Dowanol EE solvent)

After said additional 5 minutes of milling, the mixture was stirred for 4½ hours, whereupon, it was passed through a 500 mesh screen (U.S. Standard Sieve Series) and placed in a spray machine container. The viscosity was 145 centipoises.

A number of 18" x 24" magnesium photoengraving grade sheets were prepared by contact for 2 minutes on one bare metal surface with an activator pickle bath consisting of 20% phosphoric acid ($H_3PO_4$) and 10 percent ammonium bifluoride ($NH_4HF_2$), followed by a cold water rinse. The sheets so-prepared were forced air dried 5 minutes at 210° F., whereupon, they were coated by a De Vilbiss spray machine to a 0.55 mil coating thickness and dried by running them through an oven 3 times for a total of 15 minutes at 210° F. The plates were then electrostatically charged to 350–400 volts and exposed by focus techniques in a 12" x 18" camera using a screened negative transparency consisting of lines, type, and halftones to produce an electrostatic image. The so-obtained electrostatic images on the plates were developed by contact with a catalyst of dimethoxy aluminum octanoate suspended in an isoparaffinic hydrocarbon liquid called "Isopar G," rinsed substantially free of the catalyst and air dried, whereupon, the developed image was cured for 6 minutes at 500° F. A powderless etching bath in accordance with U.S. Pat. 3,152,083 was used to etch the plates. Since the plates had not previously been provided with a chromate conversion coating prior to applying the photoconductive composition, it was not necessary to use a conventional acid wash treatment to remove such conversion coating.

The cured epoxy-polyvinylbutyral-silicone resin coating so-produced was extremely adhesive and tenaceous to the bare, untreated, magnesium metal surface. Moreover, the coating was hard and ideally suited for lithograph plates, upon being treated by conventional means to render the image hydrophobic and the non-image areas hydrophilic.

Example VII

The operational steps of Example VI are repeated with the same materials and quantities there recited, except that after the resin mixture is milled for 5 minutes it is exposed to and heated to a temperature of about 100° C. throughout 8 hours of stirring, whereupon the fact that some prepolymerization occurs is evidenced by a slight increase in viscosity above the stated 145 centipoises. Upon completing the coating and etching steps, the same excellent results are observed as were noted in Example VI, the coating being tenaceous and hard.

The foregoing examples illustrate the superior adhesion to bare metal, the retention of halftone dots, and high quality of image obtained in the novel photoconductive composition of the present invention. Electrophotographic plates of this quality are very acceptable in commercial electrophotographic processing of photoengraving plates, and are eminently suited for use in lithographic plates inasmuch as photoconductive coatings prepared from the novel compositions herein are hard and adherent.

Photoconductive compositions in accordance with the present invention may also be prepared containing amounts of polyvinylbutyral resin from 1–10 percent as well as amounts of the other resins over their operable range as disclosed in the preparation of high quality, adherently coated electrophotographic plates.

I claim:

1. A photoconductive composition for use in electrophotographic reproduction which comprises from about 40 to about 90 weight percent of a photoconductive zinc oxide, and from about 60 to about 10 percent by weight of a resinous binder comprising from about 15 to about 90 percent of a solid soluble epoxy resin of diglycidyl ether of bisphenol-A having an epoxide equivalent weight of about 250 to 5500, and from about 0.25 percent to about 10 percent of polyvinylbutyral resin having an intrinsic viscosity of about 0.5 to about 1.5 and unreacted hydroxyl sites, the balance of resinous binder being up to about 84.75 percent of cross-linkable substantially non-halogenated, siloxane intermediate resin having lower alkyl or phenyl groups and possessed of active hydroxyl groups.

2. The photoconductive composition of claim 1, wherein said epoxy resin comprises a diglycidyl ether epoxy resin of bisphenol-A having an epoxide equivalent weight of from about 475 to about 2,000.

3. The photoconductive composition of claim 2, wherein said epoxy resin has an epoxide equivalent weight of from about 475 to about 575.

4. The photoconductive composition of claim 1 including a sensitizing dye to vary the spectral response of the zinc oxide component thereof.

5. The composition of claim 4, wherein the sensitizing dye is fluorescein disodium salt.

6. In an electrophotographic method of preparing etchable printing plates employing a photoconductive composition comprising a photoconductive zinc oxide suspended in a cross-linking resinous insulating film-forming binder, wherein said composition as a coating on a plate of etchable base metal of magnesium is electrostatically charged, exposed to an illuminated image, thereby forming an electrostatic image thereon, which is then developed by contacting and subsequently heating said image with a catalyst material to promote cross-linking of said resinous binder, thereby to form an etch resist image pattern; the improvement which comprises:

employing as the resinous binder component of the photoconductive composition from about 15 to about 90 percent of a solid soluble epoxy resin of diglycidyl ether of bisphenol-A having an epoxide equivalent weight of about 250 to about 5500, and from about 0.25 to about 10 percent of polyvinylbutyral resin having an intrinsic viscosity of about 0.5 to about 1.5 and unreacted hydroxyl sites, and the balance being up to about 84.75 percent of cross-linkable substantially non-halogenated siloxane intermediate resin having lower alkyl or phenyl groups and possessed of active hydroxyl groups, the total resin component of the photoconductive composition lying in the range of from about 10 to about 60 weight percent, the balance of the composition comprising said photoconductive zinc oxide.

7. The improvement of claim 6, wherein the epoxy resin has an epoxide equivalent weight of from about 475 to about 2,000.

8. The improvement of claim 7, wherein the photoconductive composition includes a sensitizing dye to vary the spectral response of the zinc oxide component.

References Cited

UNITED STATES PATENTS

| | | | |
|---|---|---|---|
| 2,937,944 | 5/1960 | Van Dorn et al. | 96—1.7 |
| 2,959,481 | 11/1960 | Kucera | 96—1.8 |
| 3,460,963 | 8/1969 | Bonjour | 96—1.8 X |

GEORGE F. LESMES, Primary Examiner

R. E. MARTIN, Assistant Examiner

U.S. Cl. X.R.

96—1.8, 36, 36.3; 260—37, 827, 837